United States Patent Office 2,695,908
Patented Nov. 30, 1954

2,695,908

POLYAMIDE COMPOSITION

Harold Wittcoff and Malcolm M. Renfrew, Minneapolis, Minn., assignors to General Mills, Inc., a corporation of Delaware No Drawing. Application April 9, 1951, Serial No. 220,137

15 Claims. (Cl. 260—398.5)

The present invention relates to a polyamide composition containing a polyamide derived from polymeric fatty acids and a phenol-formaldehyde resin derived from a phenol containing a hydrocarbon substituent.

The polyamides to which the present invention relates are those derived from polymeric fatty acids and polyamines. These polyamides are resistant to the corrosive action of water, alkali, acids, oils, greases, and organic solvents. They enjoy a variety of industrial uses, many of which are based on their adhesive properties and their ability to coat many substances, such as paper, cellulosic materials, plastics, films, and the like, to which are imparted excellent moisture-vapor and grease resistance, as well as highly desirable heat sealing properties. This latter property is particularly useful since heat seals are obtained at the very low temperatures of 80–100° C., whereas the films of this polyamide still possess excellent resistance to blocking under severe conditions of temperature, pressure, and humidity. These polyamide resins also serve as laminating agents and as adhesives for a great variety of materials, including wood, glass, and metal, as well as foil, paper, cellulosic material and plastic films. They find further application as permanent or temporary coatings.

It is frequently desirable to use these polyamides in hot-melt form. They are singularly suited for this mode of application since they are thermoplastic materials having melting points which are relatively low, such, for example, as 100–120° C. In many hot-melt applications it is the practice to melt the resins in a pot and to leave them there, sometimes with repeated melting and solidification, for long periods of time. In certain instances this has led to undesirable results since such extended heating of the resin, especially in the presence of air, has led to oxidation and the formation of undispersible, insoluble films or "skins" over the exposed surface of the polyamide. These skins have interfered with coating operations and in general have presented a considerable problem. In other instances even though skins may not form, it has been observed that the resin melt after having been subjected to high temperatures for long periods of time, demonstrates a marked increase in viscosity, thus making application more difficult. Furthermore, on some occasions it has been observed that the resin darkens appreciably on exposure to air for long periods of time in the molten state.

All of these undesirable features may probably be attributed to oxidation of the resin, which is engendered by the unsaturation which is residual after the polymerization of the drying oil or semi-drying oil fatty acids. This unsaturation may be removed by means of hydrogenation although this is a relatively expensive procedure. The present invention describes a means of overcoming these disadvantages in these polyamide materials in a simple and inexpensive way.

It has been observed that these disadvantages may be overcome by the incorporation of certain phenol-formaldehyde resins into the polyamides. The phenol-formaldehyde resins useful for this purpose are the resins derived from hydrocarbon substituted phenols, preferably in which the hydrocarbon substituent has at least 4 carbon atoms, such as para-tertiary-butyl phenol, ortho- or para-phenyl phenol, p-tert-heptyl phenol, o-tert-heptyl phenol, 2,4-di-tert-butyl phenol, o-cyclohexyl phenol, p-cyclohexyl phenol, and the like.

It is therefore an object of the present invention to provide a novel polyamide composition derived from polymeric fatty acids containing a phenol-formaldehyde resin derived from hydrocarbon substituted phenols.

The polyamides to which the present invention relates are those derived from polymeric higher fatty acids. Polyamides of this type are disclosed in Cowan et al. Patent 2,450,940, and in general, the polyamide disclosed in that patent are useful in the present invention. These polyamides are derived from polymeric fatty acids such as the polymerized fatty acids resulting from the polymerization of drying or semi-drying oils, or the free acids, or simple aliphatic alcohol esters thereof. Suitable drying or semi-drying oils include soybean, linseed, tung, perilla, oiticica, cottonseed, corn, tall, sunflower, safflower, dehydrated castor oil, and the like. In the polymerization process for the preparation of the polymeric fatty acids, the fatty acids with sufficient double bond functionality combine, for the most part, probably by a Diels-Alder mechanism, to provide a mixture of dibasic and higher polymeric acids. The acids with insufficient functionality to react remain as monomers and may be removed by distillation. The residue after distillation consists of the desired polymeric acids and this mixture is used for the preparation of polyamide resin. In the place of this method of polymerization, any other method of polymerization may be employed, whether the resultant polymer possesses residual unsaturation or not. The polymeric fat acids either by themselves or in admixture with other polybasic acids, particularly aliphatic and aromatic polybasic acids containing from 5 to 10 carbon atoms and in which the carboxyl groups are separated by at least 3 carbon atoms, such as glutaric, adipic, azelaic, sebacic and terephthalic acids, are converted to polyamides by reaction with a suitable polyamine, preferably aliphatic polyamines such as ethylene diamine, diethylene triamine, and the like. Ordinarily polyamides of this type have molecular weights varying from 3,000 to 10,000 and are resistant to the corrosive action of water, alkali, acids, oils, greases, and organic solvents. The resins derived from ethylene diamine and polymeric fat acids alone have melting points in the range of 105–120° C. Those derived from polymeric fat acids and other polybasic acids melt at higher temperatures, frequently as high as 210° C. These copolymer resins are very hard and have improved tensile strength.

Typical of the phenol-formaldehyde resins which are useful in the present polyamide compositions are those derived from ortho- or para-phenyl phenol, or from para-tertiary butyl phenol. Resins of these types are readily available commercially. These resins are effective in concentrations of from 0.1% to 5%, although the preferred range is from ½% to 2%. These materials are inexpensive and are found to prevent the skinning over or gelation of the present polyamides, while at the same time not discoloring the polyamide or affecting its properties in any way other than its stability in the molten state. The incorporation of the phenol-formaldehyde resin into the polyamide is extremely simple requiring only the addition of the phenol-formaldehyde resin to the molten polyamide with agitation.

The efficacy of the phenol-formaldehyde resin may be judged on the basis of a practical test, namely the time period required for darkening, thickening, or the formation of skins on polyamide maintained for extended periods of time in the molten state. The efficacy of these materials may also be judged on the basis of laboratory tests, such as the determination of gel time of the composition at a specific temperature such as 200° C. Other temperatures may be used for this gel time determination. However 200° C. has been chosen since this is a temperature frequently employed in actual practice for hot-melt application. In this test a thin film of the polyamide is cast on a metal plate, heated to the desired temperature and the time necessary for actual gelation is carefully measured. For comparative purposes it is essential that these gel time tests be carried out under standardized conditions. As will be seen hereinafter, the phenol-formaldehyde resins increase the gel time of the polyamide two- or three-fold, and this increase will exist even after the polyamide has been stored for as long as six months under conditions in which the surfaces of the resin are freely exposed to air.

Example 1

A polyamide was prepared from 879 g. of dimerized soybean oil fatty acids (monomer 9.0%, dimer 69.0%, trimer 22.0%), 17.6 g. of soybean oil fatty acids, and 135 g. of 67.3% aqueous ethylene diamine. The dimerized fatty acids and the soybean oil acids were placed in a 3-neck, 3-liter flask equipped with stirrer, thermometer, gas inlet tube, 35 centimeter indented column, dropping funnel, and distillation takeoff. While the flask was being flushed with nitrogen and the mixture stirred, heat was applied until the temperature reached 130° C. At this temperature ethylene diamine was added dropwise over a period of 45 minutes. The temperature was raised in 90 minutes to 200° C., where it was maintained for 3 hours. During the last hour a vacuum of 25 inches was applied. The product was allowed to cool slightly and was then poured out over Dry Ice to solidify. When cool, the product was stored under nitrogen in a desiccator until used for preparation of compositions containing the phenol-formaldehyde resins.

Two compositions were prepared from this polyamide resin, one containing 1% of a para-phenyl phenol-formaldehyde resin (BR–254), the other containing 2% of this para-phenyl phenol-formaldehyde resin. These compositions were prepared by melting the polyamide resin and merely stirring in the phenol-formaldehyde resin until a homogeneous composition was obtained. The gel time in seconds of these compositions was determined in the manner described previously and compared with the gel time for the polyamide resin itself. These gel times were determined immediately after preparation, after storage for 3 months, and after storage for 6 months. The results are shown in the following table:

| Phenol-Formaldehyde Resin | Gel time at 200° C. Immediately | Gel time at 200° C. 3 months | Gel time at 200° C. 6 months |
| --- | --- | --- | --- |
| 1% BR-254 | 2,460 | | 1,170 |
| 2% BR-254 | 3,180 | 1,710 | 1,720 |
| None | 660 | 545 | 605 |

Example 2

A polyamide resin was prepared in the manner described in Example 1 with the exception that less precautions were taken to insure the presence of an inert atmosphere for the reaction mixture. Two compositions were prepared from this polyamide, one containing 1% of para-phenyl phenol-formaldehyde resin, the other containing 1% of para-tertiary butyl phenol-formaldehyde resin. These two samples were placed in open-mouthed vessels, as was a control sample of the polyamide resin. These three samples were stored in an oven at 170–180° C. At the end of 3 days the control sample started to show signs of oxidation and after 6 days the control sample had "skinned over" completely, whereas "skin" formation had barely started in the other two samples at the end of 8 days.

Example 3

In this example the polyamide resin employed was prepared exactly like the one described in Example 1 except that only 8% sebacic acid (based on the dimer acid content) was used. This product had the following properties:

Ball and ring melting point _____ 173° C
Acid number _____ 4.9.
Color (Gardner, 35% solution in butanol toluene (1:1)) _____ 11.
Gel time at 200° C. _____ 900 seconds.

To 250 parts of this resin was added 5 parts of a paratertiary butyl phenol-formaldehyde resin known as BR–4036. The gel time at 200° C. of this composition was 2400 seconds, thus indicating a marked increase in heat and oxidative stability due to the presence of the stabilizing ingredient.

To a second sample of this resin (250 parts) was added five parts of ortho-phenyl phenol-formaldehyde resin with a melting point of about 150° C. and a molecular weight in the region of 1500–1700. This melt demonstrated a gel time at 200° C. of 1440 seconds, again indicating a marked increase in stability due to the addition of the phenolic resin.

We claim as our invention:

1. A polyamide composition comprising a polyamide containing a polyacyl group derived from polymeric fatty acids, and a polyamino group derived from ethylene diamine, the polyamide having a molecular weight within the approximate range of 3,000 to 10,000, said composition containing and being stabilized by from .1% to 5% of a phenol-formaldehyde resin based on the weight of the polyamide, the phenol-formaldehyde resin being derived from a hydrocarbon substituted phenol.

2. A polyamide composition comprising a polyamide containing a diacyl group derived from dimeric fatty acids, and a diamino group derived from ethylene diamine, the polyamide having a molecular weight within the approximate range of 3,000 to 10,000, said composition containing and being stabilized by from .1% to 5% of a phenol-formaldehyde resin based on the weight of the polyamide, the phenol-formaldehyde resin being derived from a hydrocarbon substituted phenol.

3. A polyamide composition comprising a polyamide containing a diacyl group derived from dimeric fatty acids, and a diamino group derived from ethylene diamine, the polyamide having a molecular weight within the approximate range of 3,000 to 10,000, said composition containing and being stabilized by from 0.1% to 5% of a para-tertiary butyl phenol-formaldehyde resin based on the weight of the polyamide.

4. A polyamide composition comprising a polyamide containing a diacyl group derived from dimeric fatty acids, and a diamino group derived from ethylene diamine, the polyamide having a molecular weight within the approximate range of 3,000 to 10,000, said composition containing and being stabilized by from 0.1% to 5% of a para-phenyl phenol-formaldehyde resin based on the weight of the polyamide.

5. A polyamide composition comprising a polyamide containing a diacyl group derived from dimeric fatty acids, and a diamino group derived from ethylene diamine, the polyamide having a molecular weight within the approximate range of 3,000 to 10,000, said composition containing and being stabilized by from .5% to 2% of a para-tertiary butyl phenol-formaldehyde resin based on the weight of the polyamide.

6. A polyamide composition comprising a polyamide containing a diacyl group derived from dimeric fatty acids, and a diamino group derived from ethylene diamine, the polyamide having a molecular weight within the approximate range of 3,000 to 10,000, said composition containing and being stabilized by from .5% to 2% of a para-phenyl phenol-formaldehyde resin based on the weight of the polyamide.

7. A polyamide composition comprising a polyamide containing a mixture of di- and tri-acyl groups derived from polymeric fatty acids, and a diamino group derived from ethylene diamine, the polyamide having a molecular weight within the approximate range of 3,000 to 10,000, said composition containing and being stabilized by from 0.1% to 5% of a phenol-formaldehyde resin based on the weight of the polyamide, the phenol-formaldehyde resin being derived from a hydrocarbon substituted phenol.

8. A polyamide composition comprising a polyamide containing a mixture of di- and tri-acyl groups derived from polymeric fatty acids, and a polyacyl group derived from a polybasic acid containing from 5 to 10 carbon atoms in which the carboxyl groups are separated by at least 3 carbon atoms, and a diamino group derived from ethylene diamine, the polyamide having a molecular weight within the approximate range of 3,000 to 10,000, said composition containing and being stabilized by from 0.1% to 5% of a phenol-formaldehyde resin based on the weight of the polyamide, the phenol-formaldehyde resin being derived from a hydrocarbon substituted phenol.

9. A polyamide composition comprising a polyamide containing a mixture of di- and tri-acyl groups derived from polymeric fatty acids, and a diamino group derived from ethylene diamine, the polyamide having a molecular weight within the approximate range of 3,000 to 10,000, said composition containing and being stabilized by from 0.1% to 5% of a para-phenyl phenol-formaldehyde resin based on the weight of the polyamide.

10. A polyamide composition comprising a polyamide containing a mixture of di- and tri-acyl groups derived from polymeric fatty acids, and a diamino group derived from ethylene diamine, the polyamide having a molecular weight within the approximate range of 3,000 to 10,000, said composition containing and being stabilized by from 0.1% to 5% of a para-tertiary butyl phenol-formaldehyde resin based on the weight of the polyamide.

11. A product according to claim 8 in which the polybasic acid is adipic acid.

12. A product according to claim 8 in which the polybasic acid is sebacic acid.

13. A polyamide composition comprising a polyamide containing the di- and triacyl groups of polymeric fat acids, and the poly-acyl group of sebacic acid, and the diamino group of ethylene diamine, said polyamide having a molecular weight within the approximate range of 3,000 to 10,000, said composition containing and being stabilized by from 0.1% to 5% of a para-phenyl phenol-formaldehyde resin.

14. A polyamide composition comprising a polyamide containing a polyacyl group derived from polymeric fatty acids, and a polyamino group derived from an aliphatic polyamine, said composition containing and being stabilized by from .1–5% of a phenol-formaldehyde resin based on the weight of the polyamide, said phenol-formaldehyde resin being derived from a phenol containing a hydrocarbon substituent.

15. A polyamide composition comprising a polyamide containing a diacyl group derived from dimeric fatty acids, and a diamino group derived from an aliphatic diamine, said composition containing and being stabilized by from .1%–5% of a phenol-formaldehyde resin based on the weight of the polyamide, said phenol-formaldehyde resin being derived from a phenol containing a hydrocarbon substituent.

References Cited in the file of this patent

UNITED STATES PATENTS

| Number | Name | Date |
|---|---|---|
| 2,071,250 | Carothers | Feb. 16, 1937 |
| 2,450,940 | Cowan et al. | Oct. 12, 1948 |
| 2,555,111 | Bradley | May 29, 1951 |

OTHER REFERENCES

"Norelac," article by Cowan et al., Oil and Soap, April 1944, pages 101–107, vol. 21.